Patented Dec. 4, 1951

2,577,226

UNITED STATES PATENT OFFICE 2,577,226

CHOLESTERYL AMINES AND METHOD OF PREPARING THE SAME

Seymour Bernstein and Karl J. Sax, Pearl River, N. Y., assignors to American Cyanamid Company, New York, N. Y., a corporation of Maine No Drawing. Application April 13, 1949, Serial No. 87,346

2 Claims. (Cl. 260—239.5)

This invention relates to new organic compounds and a method of preparing the same. More particularly, it relates to 7-amino derivatives of cholesterol and methods for their preparation.

In the past unsaturated compounds such as cyclohexane and cholesteryl esters have been brominated by the use of brominating agents such as N-bromosuccinimide (see Ziegler et al.; Ann., vol. 551; 80 (1942)). These 7-bromocholesteryl esters, when treated with a tertiary amine, split out the halogen acid as a salt of the intermediate and form a compound having conjugated double bond system. An improved process of preparing 7-dehydrocholesteryl esters by this method is described in the copending application of the present inventors, Serial Number 714,662, filed December 6, 1946, now abandoned.

We have now found, surprisingly, that when a 7-halocholesterol derivative is reacted with a primary or secondary amine a hydrohalogen acid is split out but instead of obtaining the 7-dehydrocholesterol derivative the amino group adds on to the cholesterol nucleus in the 7-position.

The compounds which can be prepared by the process of the present invention may be illustrated by the following general formula:

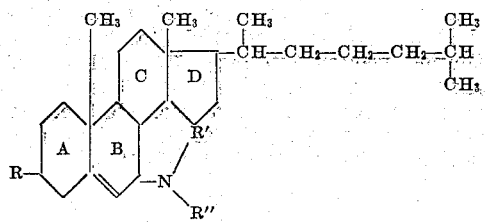

in which R is a member of the group consisting of carbalkoxy, carbaryloxy, hydroxyl and halogen radicals and

represents a radical of the group consisting of nitrogen containing heterocyclic radicals, R' and R" being the remaining portion of the heterocyclic ring and the radical of a secondary amine, R' representing hydrogen and R" representing aryl, heterocyclic and carbocyclic radicals. These compounds, in general, are crystalline solids and are soluble in carbon tetrachloride, and chloroform. They are insoluble in water.

As stated above, the products of the present invention are prepared by reacting a 7-halocholesterol derivative with a primary or secondary amine. The reaction may be illustrated by the following equation:

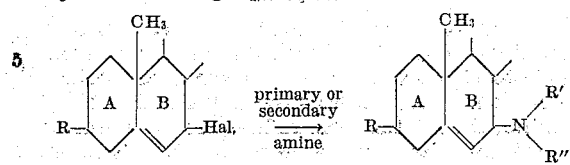

in which Hal. is halogen and R and

are as previously defined.

The intermediates useful in carrying out the present process are prepared by halogenating a cholesteryl ester or other derivative, preferably with an agent such as bromosuccinimide, bromophthalimide, and the like.

The other intermediates can be primary and secondary amines such as 3-aminopyridine, 2-aminothiazole, aniline, para-acetaminoaniline, piperidine and the like.

In carrying out the reaction of the present invention we prefer to use an inert organic solvent such as ether, carbon tetrachloride, ethyl acetate, and the like. Also, aromatic hydrocarbons such as benzene and xylene can be used. The reaction can also be conducted in the absence of a solvent, particularly where one of the intermediates is a liquid, in which case it can be used in excess. The reaction is preferably carried out at a temperature of from 15° C. to about 150° C. The reaction is usually completed within a period of 10 minutes to 2 or 3 days, depending upon the temperature used.

The process is preferably carried out using an ester of cholesterol. Should the 7-amino derivative of cholesterol itself be desired, it can be obtained by hydrolyzing the corresponding ester with a solution of an alkali metal hydroxide as shown in the examples.

The compounds of the present invention are useful in the preparation of pharmaceuticals.

The invention will be described with greater particularity in the following examples which illustrate the preferred method of preparing the 7-aminocholesterol derivatives from the corresponding 7-halocholesteryl esters.

Example 1

A mixture of 9.8 g. (0.02 mole) of cholesteryl benzoate, 4.28 g. (0.024 mole) of N-bromosuccinimide and 100 ml. of petroleum-ether (B. P. 64°-

66° C., freed of unsaturates with sulfuric acid and permanganate) was refluxed and irridiated by the heat and light of two photospot lamps (General Electric Co., RSP-2); and at the end of the reflux time 5 ml. of aniline was added. The mixture was cooled and filtered. The very turbid filtrate was evaporated at reduced pressure, the residue treated with 100 ml. of toluene and 1 ml. of aniline. The mixture was refluxed for 10 minutes, cooled and filtered through diatomaceous earth. The filtrate was evaporated under reduced pressure and gave a dark red oil which was treated with acetone to give a brown-red solution. The solution on being further worked up gave crystals which were collected and washed with acetone. Three recrystallizations from acetone gave 2.07 g. of 7-anilinocholesteryl benzoate having a melting point of 185°–187° C. From the mother liquors an additional 0.63 g. of the desired product was obtained, melting point 185°–187.5° C.

Example 2

19.5 g. of 7-beta-bromocholesteryl benzoate (melting point 139°–141° C., prepared from cholesteryl benzoate and N-bromosuccinimide) in 150 ml. of toluene was treated with 7.5 ml. of aniline; the mixture was refluxed for 15 minutes, cooled, and the solid was separated by filtration. The filtrate was evaporated under reduced pressure. This gave a semi-solid which was dissolved in acetone, the solution was concentrated and cooled. The white solid was separated and washed with acetone. Two recrystallizations from acetone gave 4.77 g., melting point 186°–188° C. One gram of this material was recrystallized once more from acetone, weight 0.58 g., melting point 187°–189° C. On analysis the values for carbon, hydrogen and nitrogen agreed very closely with the theoretical values for 7-anilinocholesteryl benzoate.

Example 3

Eleven (11) grams of cholesteryl acetate in 100 ml. of petroleum-ether, (B. P. 64°–66° C., purified as in Example 1) was refluxed for 3 minutes with 5.5 g. of N-bromosuccinimide in the presence of two photospot lamps. Five (5) ml. of aniline was added to the still refluxing mixture which was then cooled and filtered. The very turbid filtrate was evaporated under reduced pressure for the removal of petroleum-ether, and the residue was treated with 100 ml. of toluene and 1.6 ml. of aniline. The mixture was refluxed for 10 minutes, cooled and filtered through diatomaceous earth. Evaporation under reduced pressure of the filtrate gave an oil which was dissolved in acetone and treated with methanol. The oil on being worked crystallized and the oily crystals were separated by filtration and washed with methanol. Four recrystallizations from acetone-methanol gave 2.01 g. of 7-anilinocholesteryl acetate, melting point 185°–187.5° C.

Example 4

One-half (½) gram of 7-anilinocholesterol in 5 ml. of pyridine was treated in the cold with ½ ml. of acetic anhydride. The solution was allowed to stand at room temperature overnight. On the addition of cold dilute hydrochloric acid an oil separated which on being worked turned solid. The solid was collected by filtration and was washed with water. Recrystallization from benzene-methanol and acetone-methanol gave 0.45 g. of 7-anilinocholesteryl acetate, melting point 185°–187° C.

Example 5

One-half gram of 7-anilinocholesterol in 5 ml. of pyridine was treated in the cold with 0.4 g. of 3,5-dinitrobenzoyl chloride. The mixture was allowed to stand at room temperature overnight. Addition of cold dilute hydrochloric acid gave an oil which was worked up in benzene in the usual manner. The benzene extract was dried with anhydrous magnesium sulfate, treated wtih activated charcoal and filtered through diatomaceous earth. The benzene filtrate was concentrated with the simultaneous addition of absolute ethanol. This gave orange crystals which were collected by filtration and washed with absolute ethanol. Recrystallization from benzene-absolute ethanol gave 0.55 g., of 7-anilinocholesteryl-3,5-dinitrobenzoate, melting point 196.5°–198° C.

Example 6

A mixture of 11.0 g. (0.0184 mole) of cholesteryl 3,5-dinitrobenzoate, 3.95 g. (0.022 mole) N-bromosuccinimide and 100 ml. of carbon tetrachloride was refluxed by the heat and light from two photospot lamps for three minutes. To the still refluxing mixture there was added 0.37 ml. (0.0405 mole) of aniline. The mixture was cooled, and the solid was removed by filtration.

One-half of the filtrate was distilled under reduced pressure, 50 ml. of toluene added, and the mixture was refluxed for 10 minutes. It was then cooled and filtered. The filtrate was evaporated under reduced pressure and the residue dissolved in acetone. Three and one-half (3½) grams of crystals separated, melting point 155°–157° C. After ten recrystallizations there remained 0.22 g. of 7-anilinocholesteryl 3,5-dinitrobenzoate, melting point 193°–194.5° C.

Example 7

A mixture of 200 mg. of 7-anilinocholesteryl acetate (prepared directly from cholesteryl acetate as in Example 3) and 15 ml. of 5% alcoholic potassium hydroxide was refluxed on the steam bath for 0.5 hour. Water was added and the mixture was cooled; the turbid solution on standing gave crystals. It was set in the refrigerator for several hours. The crystals were separated and washed with dilute methanol, water and dilute methanol, weight 110 mg. From the mother liquor there was obtained 40 mg. The two fractions were combined and recrystallized from dilute methanol, weight 145 mg. of 7-anilinocholesterol, melting point 161°–163° C.

Example 8

A mixture of 6.9 g. of 7-anilinocholesteryl benzoate (prepared directly from cholesteryl benzoate as in Example 1) and 200 ml. of 5% alcoholic potassium hydroxide refluxed on the steam bath for 50 minutes. Water (200 ml.) was added and on cooling an oil separated, which on being worked solidified. The solid was collected by filtration and was washed with 50% methanol, water and 50% methanol. The product, 7-anilinocholesterol, was recrystallized from dilute methanol, weight 5.16 g., melting point 161°–163.5° C.

Example 9

A mixture of 2 g. of 7-beta-bromocholesteryl benzoate (prepared from cholesteryl benzoate with N-bromosuccinimide), 1 ml. of piperidine and 25 ml. of toluene was refluxed for 0.5 hour, cooled, and the solid was removed by filtration. The filtrate was evaporated under reduced pressure and the solid residue was dissolved in acetone. On being cooled the solution gave needles which were separated and washed with acetone. Recrystallization from acetone or ether-methanol gave 7-piperidinocholesteryl benzoate having a melting point of 165°–167° C. The product gave a negative Beilstein test for halogen.

*Example 10*

Five hundred (500) ml. of 7-piperidinocholesteryl benzoate in 25 ml. of 5% alcoholic potassium hydroxide was refluxed for one hour on the steam bath. The solution was cooled and treated with water. This gave an oil which became crystalline. It was collected by filtration and washed with water. Several recrystallizations from acetone gave 39 mg. of 7-piperidinocholesterol, melting point 134°–137° C.

*Example 11*

A mixture of 4.0 g. (0.007 mole) of 7-beta-bromocholesteryl benzoate, 2.1 g. (0.014 mole) of p-aminoacetanilide and 40 ml. of xylene was refluxed for 15 minutes, cooled and filtered. The xylene was removed under reduced pressure. Acetone was added to the oily residue and allowed to stand overnight. This gave crystals which were removed by filtration, weight 0.75 g., melting point 126°–131° C., cloudy melt which cleared at 161° C. An absorption spectrum showed this material to be impure 7-dehydrocholesteryl benzoate.

The mother liquor was concentrated with the addition of water, and this treatment gave an oil which was separated by decantation. Crystallization from dilute acetone gave 1.15 g. of solid. Recrystallization from dilute acetone gave 0.6 g. of 7-[p-acetaminoanilino-]cholesteryl benzoate, melting point 214°–219° C. (with previous darkening and softening).

*Example 12*

A mixture of 0.46 g. of 7-[p-acetaminoanilino]cholesteryl benzoate and 40 ml. of 5% alcoholic potash was refluxed on the steam bath for 0.5 hour, and cooled. Crystals separated only after the addition of water. The crystals were collected by filtration and were washed successively with 50% ethanol, water, 50% ethanol and water. During the last washings the crystals assumed a pink superficial coloration. Recrystallization from dilute ethanol gave very slightly colored pink crystals, melting point 198.5°–201° C. (dark red melt with much previous softening and darkening from 190° C. up). The material was dissolved in methanol at room temperature and gave a strong purple-red clear solution. The color was not removed with activated charcoal. The solution was concentrated with the addition of water until the solution was turbid, and was then cleared with methanol. The solution on standing gave light purple crystals which were collected and washed with dilute methanol. The product 7-[p-acetaminoanilino]cholesterol, weight 0.28 g., melting point 201°–203° C., brown-red melt with slight previous softening at 200°–201° C.

*Example 13*

Two grams (0.0035 mole) of 7-beta-bromocholesteryl benzoate, 0.66 g. (0.007 mole) of beta-aminopyridine and 25 ml. of toluene was refluxed for 15 minutes, during which time an oil separated. The mixture was cooled, anhydrous magnesium sulfate was added, and the mixture was filtered through diatomaceous earth. The brown filtrate on standing assumed a green coloration. It was evaporated under reduced pressure and gave a very viscous greenish oil interspersed with solid. Acetone was added, and warmed to dissolve the green oil. This gave a turbid solution interspersed with oil. Addition of methanol gave a clear solution and crystals separated. More methanol was added and the mixture was allowed to stand. It was then cooled in ice water and filtered with methanol. The material had an absorption maximum of 235 m$\mu$ and from all appearances was doubly unsaturated. The mother liquor was concentrated with the addition of methanol. On being cooled the solution gave an oil which on being worked became crystalline. It was collected by filtration and washed with methanol. The mother liquor from this filtration gave 0.19 g. Both fractions were combined and recrystallized from acetone-methanol, weight 0.37 g., melting point 213°–216° C. (dark red melt), negative Beilstein test for halogen, water insoluble. Recrystallization from acetone-methanol gave 0.18 g. of 7-(beta-aminopyridino)cholesteryl benzoate, melting point 221°–223.5° C.

*Example 14*

Ninety milligrams of 7-(beta-aminopyridino)cholesteryl benzoate in 15 ml. of 5% alcoholic potash was refluxed on the steam bath for 0.5 hour, and cooled. Addition of water gave a precipitate which was separated. It was washed with copious amounts of water and 50% methanol. The material was insoluble in ether, but soluble in methanol at room temperature. Recrystallization from dilute methanol gave 60 mg., melting point (120°–140° C. solvate or transition), 193°–194° C. with previous softening and shrinkage. The product 7-(beta-aminopyridino)cholesterol, was dried under reduced pressure at 100° C. for several hours.

*Example 15*

A mixture of 2 g. (0.0035 mole) bromocholesteryl benzoate, 0.7 g. (0.007 mole) of 2-aminothiazole and 25 ml. of toluene was refluxed for 15 minutes. During this time an oil separated. Anhydrous magnesium sulfate was added to the cooled reaction mixture which was then filtered through diatomaceous earth. The filtrate was evaporated under reduced pressure and gave a colored oil which was dissolved in acetone. The solution on being worked gave crystals which were separated. Two recrystallizations from acetone gave 0.54 g., melting point 123°–125° C., cloudy melt cleared at 190° C. This material appeared to be primarily a doubly unsaturated benzoate, namely, $\Delta^{4,6}$-cholestadienyl benzoate.

The first acetone mother liquor on working with methanol gave crystals, melting point 78°–92° C., uncollapsed red, at 165° C. brown-red melt. Six recrystalizations from ether-methanol to constant melting point gave 0.16 g., melting point 179°–180° C. (solvent off at 168° C.). The product, 7-(2'-thiazolylamino)cholesteryl benzoate, was dried under reduced pressure at 100° C. for several hours, melting point 178°–181° C., brown-red melt (softening and some change at 165°–170° C.).

*Example 16*

A mixture of 0.13 g. of 7-(2'-thiazolylamino)cholesteryl benzoate and 20 ml. of 5% alcoholic potash was refluxed on the steam bath for 0.5 hour, cooled, and a large amount of water was added. This treatment gave a finely divided precipitate, and the mixture was allowed to stand at room temperature for several hours. The solid was collected by filtration, and was washed with water and 50% methanol. The product, 7-(2'-thiazolylamino)cholesterol, weighed 0.06 g., melting point 230°-234° C., red melt, softening at 228°-230° C.

*Example 17*

A mixture of 2.0 g. of 7-bromocholesteryl bromide, 1 ml. of aniline and 20 ml. of toluene was refluxed for 15 minutes, cooled, and the aniline hydrobromide was removed by filtration. The toluene was removed under reduced pressure and the residue was dissolved in ether, washed twice with cold dilute hydrochloric acid and twice with dilute sodium bicarbonate. The ether extract was dried over magnesium sulfate, treated with activated charcoal and filtered. It was concentrated with ethanol to give an oil. It was separated by decantation. The decantate also gave an oil which was likewise separated. This second decantate on working gave a solid, weight 0.37 g., melting point 54°-63° C.

The oils described above were combined, dissolved in ether and concentrated with alcohol. This gave an oily solid which was combined with the other solid fraction, weight 1.07 g., of 7-anilinocholesteryl bromide, slightly colored.

*Example 18*

A mixture of 3 g. of 7-bromocholesteryl bromide, 2 ml. of piperidine and 30 ml. of toluene was refluxed for 15 minutes, cooled and treated with magnesium sulfate. The slurry was filtered, and the filtrate was evaporated under reduced pressure to give an oil. This was taken up in ether, and the extract was washed successively with water, dilute hydrochloric acid, water, sodium bicarbonate and water. The ether solution dried with anhydrous magnesium sulfate was treated with activated charcoal, filtered and concentrated with the simultaneous addition of ethanol until all of the ether was removed. An oil separated which on being cooled became a solid glass and/or solid. It was filtered and washed with methanol. The product, 7-piperidino-cholesteryl bromide, weighed 0.33 g.

We claim:

1. The compound 7-piperidinocholesteryl benzoate having the formula:

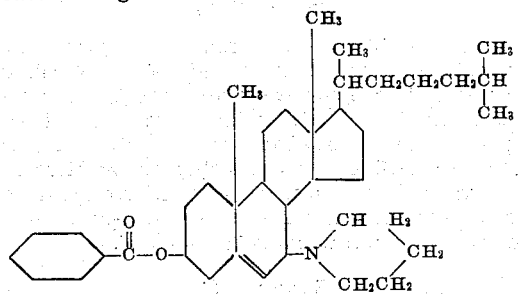

2. A method of preparing 7-piperidino cholesteryl benzoate which comprises heating a 7-halocholesteryl benzoate with piperidine in a solvent and recovering said compound therefrom.

SEYMOUR BERNSTEIN.
KARL J. SAX.

REFERENCES CITED

The following references are of record in the file of this patent:

UNITED STATES PATENTS

| Number | Name | Date |
|---|---|---|
| 2,209,934 | Rosenberg | July 30, 1940 |
| 2,228,496 | Windhaus et al. | Jan. 14, 1941 |
| 2,386,635 | Rosenberg | Oct. 9, 1945 |
| 2,428,368 | Julian et al. | Oct. 7, 1947 |
| 2,446,538 | Julian et al. | Aug. 10, 1948 |

OTHER REFERENCES

Eckhardt: Ber. der Deu. Chem., vol. 71 (1938), pp. 461-470.

Lieb et al.: Annalen, vol. 509 (1934), p. 214.